May 24, 1938.  B. E. RICKER  2,118,231
TRAILER HITCH
Filed Sept. 28, 1936
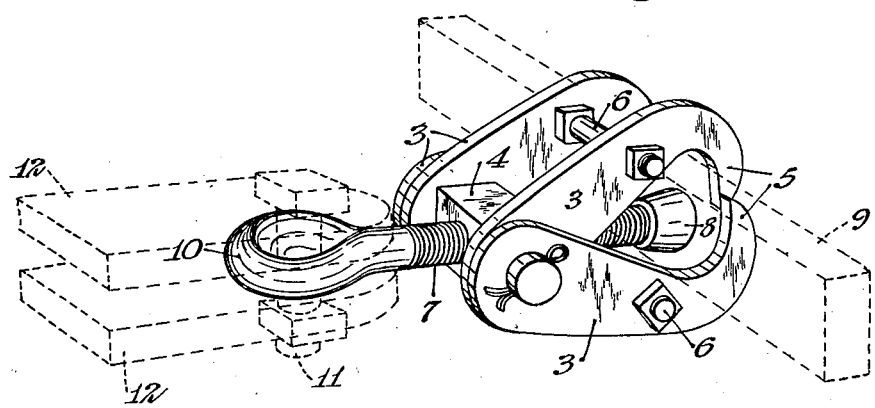
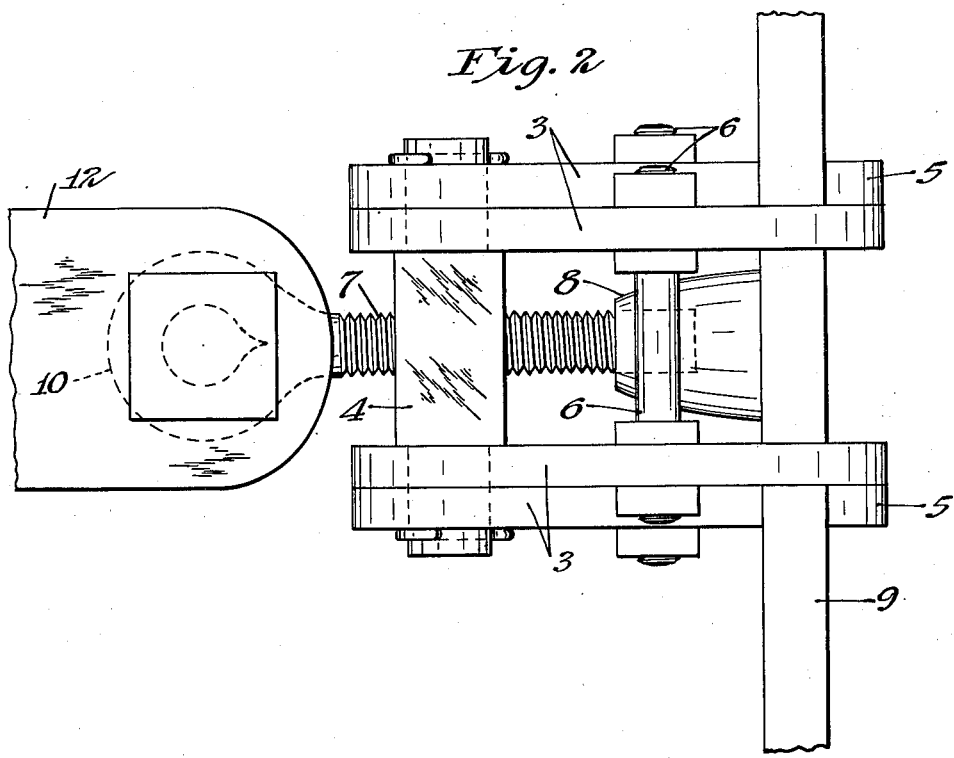
Inventor
Berthold E. Ricker
By Williamson & Williamson
Attorneys

UNITED STATES PATENT OFFICE 2,118,231

TRAILER HITCH

Berthold E. Ricker, St. Cloud, Minn.

Application September 28, 1936, Serial No. 102,829

1 Claim. (Cl. 280—33.15)

This invention relates to hitching devices and more particularly to that class known as trailer hitches.

It is an object of my invention to provide a trailer hitch which may be quickly connected and, at the same time, provide the strength and rigidity necessary in devices of this type.

It is a further object of my invention to provide a trailer hitch which forms a rigid connection and, at the same time, provides a freely operating pivot between the vehicles connected by it.

Other and further objects and advantages will become apparent from the following description made in connection with the accompanying drawing, wherein like reference characters refer to the same or similar parts throughout the various views, and in which:—

Fig. 1 is a perspective view of my invention with parts of connected vehicles shown in dotted lines; and Fig. 2 is a plan view of the device.

In the particular embodiment shown in the drawing, I provide pairs of jaw members 3 which are spaced apart and provided with a common pivot pin 4 which has a central aperture running transversely therethrough with threads in its inner walls. The jaws are provided with hook-like ends 5 and, if desired, braces 6 may be provided near said hook-like ends to give added rigidity to the jaw members.

Supported in the threaded aperture in the pivot pin 4 is a draft bolt 7 which is provided with threads to co-operate with the threaded aperture mentioned above. On the inner end of said draft bolt, I provide an enlarged face member 8 which is adapted to bear against one side of a vehicle part 9 which may be a bumper bar or other suitable cross member on one of the vehicles connected by my device. The base member 8 may be secured to the draft bolt by threading it on the end of said bolt or by any other suitable means. On the opposite or outer end of said draft bolt, I provide a loop member 10 which is adapted to receive a bolt 11 which is shown secured in the end of a bar 12 which may be the draft bar of a trailer or other vehicle.

When it is desired to connect two vehicles with my device, I first place the jaw members 3 so that their hooked ends engage one side of the bumper bar or cross bar 9 which forms part of one of the vehicles to be connected and then screw the draft bolt 7 into engagement with the other side of the member 9, thereby holding the hitch in a rigid position with respect to said bar 9. The draft bolt should be turned so that in its final position the loop member 10 on the opposite end of said bolt will be horizontal. Then the member 12 of the other vehicle to be connected may be secured by placing the bolt 11 through the member 12 and the loop 10. The above mentioned loop member and the bolt 11 will form a pivot between the two vehicles to permit them to turn easily, but, as can be readily seen, the vehicles are held against any relative vertical movement because of the fact that the draft bolt 7 has been screwed tightly against the vehicle cross bar 9.

From the foregoing description, it will be seen that I have provided a trailer hitch of simple but rigid construction, which can be quickly and easily secured in position and cannot become accidentally disconnected as a result of road shocks and vibration, since it would be necessary to remove the bolt 11 and rotate the draft bolt 7 before the device can be loosened up for removal.

It will, of course, be understood that various changes may be made in the form, details, arrangement and proportions of the various parts without departing from the scope of the present invention.

What is claimed is:—

A trailer hitch for vehicles comprising pairs of relatively widely spaced hook-like jaw members, a common pivot pin for said jaw members having a threaded opening therethrough, braces between the pairs of jaw members, a threaded draft bolt extending inwardly through said threaded opening to a point adjacent the ends of said jaw members and outwardly beyond said pivot pin, an enlarged vehicle-engaging base on the inner end of said bolt, and a loop on the other end of said bolt.

BERTHOLD E. RICKER.